United States Patent [19]

Goto

[11] Patent Number: 5,097,354

[45] Date of Patent: Mar. 17, 1992

[54] BEAM SCANNER

[75] Inventor: Hiroshi Goto, Yamatokoriyama, Japan

[73] Assignee: Omron Corporation, Kyoto, Japan

[21] Appl. No.: 558,425

[22] Filed: Jul. 27, 1990

[30] Foreign Application Priority Data

Jul. 27, 1989 [JP] Japan .................. 1-196064
Aug. 17, 1989 [JP] Japan .................. 1-211891

[51] Int. Cl.$^5$ ............................................. G02B 26/08
[52] U.S. Cl. ................................. 359/212; 359/213; 359/223
[58] Field of Search ............... 350/6.5, 6.6, 6.1, 6.3, 350/486, 487, 452, 632, 355; 250/347, 348

[56] References Cited

U.S. PATENT DOCUMENTS

| | | | |
|---|---|---|---|
| 1,438,974 | 12/1922 | Wente | 359/224 |
| 4,074,312 | 2/1978 | van Rosmalen | 359/223 |
| 4,123,166 | 10/1978 | Botcherby et al. | 359/210 |
| 4,123,167 | 10/1978 | Botcherby et al. | 359/210 |
| 4,712,887 | 12/1987 | Baer | 359/210 |

Primary Examiner—Loha Ben
Attorney, Agent, or Firm—Dickstein, Shapiro & Morin

[57] ABSTRACT

The invention provides a beam scanner comprising a light-emitting element, a lens disposed forwardly of the light-emitting element in such a manner that its optical axis is parallel to the optical axis of the light-emitting element, and a rocking reflective mirror which is rotated by Coulomb force acting between static electrodes. There also is provided a beam scanner comprising a light-emitting element, a lens disposed forwardly of the light-emitting element in such a manner that its optical axis is parallel to the optical axis of the light-emitting element, and a displacement mechanism for reciprocal displacement of either the light-emitting element or the lens in a direction generally perpendicular to the optical axis thereof. The beam scanner of the invention is compact and permits reciprocal scanning.

8 Claims, 5 Drawing Sheets

1

BEAM SCANNER

BACKGROUND OF THE INVENTION

1. Field of the Invention

This invention relates to a beam scanner for use in laser printer, bar code reader and other applications.

2. Brief Description of the Prior Art

The conventional beam scanner is illustrated in FIG. 10.

In this scanner, the light beam l3 emergent from a light source is incident on a polygonal mirror 21 and as the mirror 21 is rotated by a motor 22. The direction of a reflection light beam l4 emergent from the polygonal mirror 21 is varied for scanning. The reference numerals 23 and 24 indicate cylindrical lenses and the numeral 25 indicates a scanning condenser 25.

The above prior art beam scanner has the following disadvantages.

(a) The component parts of the scanner are fairly large and particularly the polygonal mirror 21 and motor 22 impose limitations on overall size reduction.

(b) The polygonal mirror 21 has a plurality of sequentially switchable effective reflective surfaces 21a and because all of the reflective surfaces 21a must reflect the light beam l4 in a uniform way, they must be equivalent in workmanship but the manufacture of such a polygonal mirror calls for high skill and cost.

(c) As the scanning angle of the light beam l4 is fixed by the angle which each reflective surface 21a makes with the center of the polygonal mirror 21, the scanning angle cannot be altered.

(d) Because the polygonal mirror 21 is always rotated in a given direction, the scanning direction of light beam l4 is limited to only one direction, i.e. from right to left or vice versa.

Having been accomplished to overcome the above disadvantages, this invention has as its primary object to provide a beam scanner which is capable of reciprocally scanning in two directions.

Other objects and advantages of the invention will become apparent as the following description proceeds.

SUMMARY OF THE INVENTION

This invention, in one aspect, provides an improved beam scanner comprising a light-emitting element, a lens disposed forwardly of the light-emitting element in such a manner that its optical axis is parallel to the optical axis of the light-emitting element, and a rocking reflecting mirror which is rocked by Coulomb force acting between opposed static electrodes.

In another aspect, this invention provides an improved beam scanner comprising a light-emitting element, a lens disposed forwardly of the light-emitting element in such a manner that its optical axis is parallel to the optical axis of the light-emitting element, and a displacement mechanism for reciprocal displacement of either the light-emitting element or the lens in a direction generally perpendicular to the optical axis thereof.

BRIEF DESCRIPTION OF THE DRAWINGS

FIGS. 1 through 5 show a first embodiment of the invention.

Thus, FIG. 1 is a front view showing a beam scanner;

FIG. 2 is a perspective disassembled view showing the rocking reflecting mirror of the beam scanner as show in up-side-down relation;

FIG. 3 is a circuit diagram showing the electrical system of the beam scanner;

FIG. 4 is a schematic view showing the two-dimensional scanning mode;

DETAILED DESCRIPTION

Figure 1:
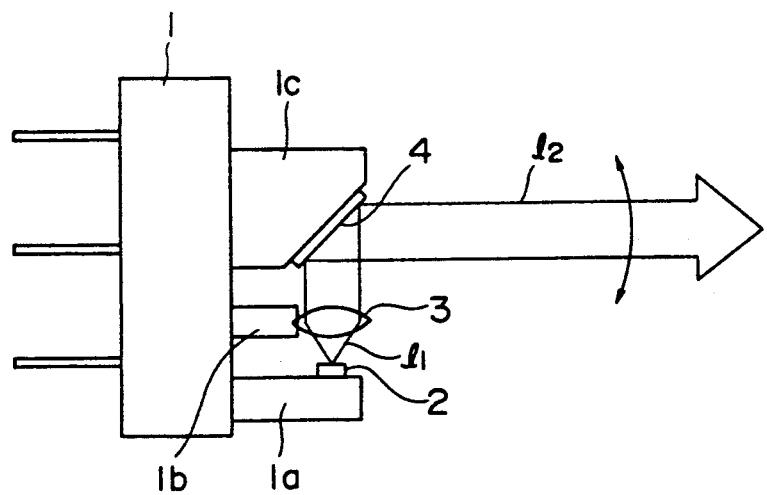

Referring to FIG. 1, which illustrates a first embodiment of this invention, an insulating stem 1 is integrally formed with three pedestals 1a, 1b and 1c. A light-emitting element 2 is mounted on the pedestal 1a. A lens 3 is mounted on the pedestal 1b and a rocking reflective mirror 4 is mounted on the pedestal 1c. The light-emitting element 2 can for example be a semiconductor laser or a light-emitting diode. The lens 3 can for example be a grating lens can for example be a grating lens (Fresnel lens) or aspherical lens which collimates a light beam 11 for the light emitting element 2. The optical axis of the lens 3 coincides with the optical axis of the light-emitting element 2 and the focal point of the lens 3 is on the light emission point of the light-emitting element 2.

Figure 2:
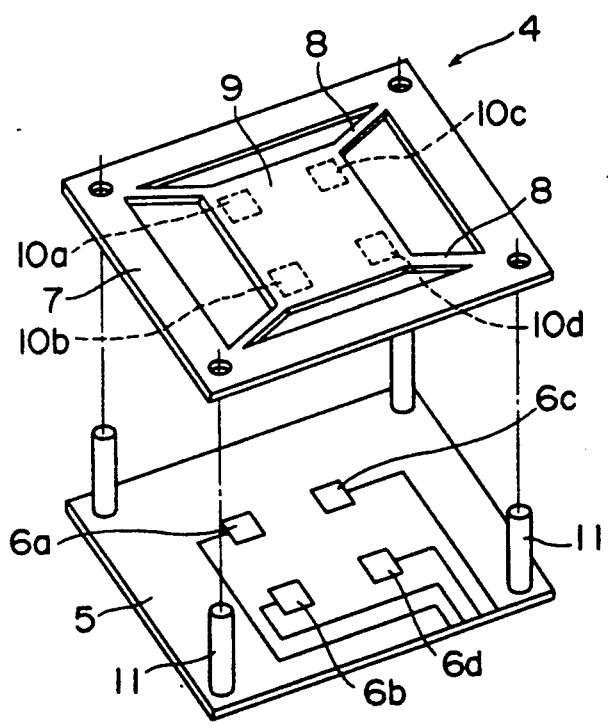

The mounting surface of the pedestal 1c carrying the rocking reflective mirror 4 is inclined by 45° with respect to the optical axes of the light-emitting element 2 and the lens 3. The construction of the rocking reflective mirror 4 is described in detail below, referring to FIG. 2 which is a disassembled view showing the mirror in the up-side-down relation.

An insulating or dielectric electrode base 5 is disposed on the inclined surface of pedestal 1c. On the surface of this electrode base 5, four static electrodes 6a through 6d are formed, for example by vacuum vapor deposition, at the four corners of a centrally positioned imaginary square. A rectangular mirror base 7 faces electrode base 5. Four torsion bars 8 extend inwardly from the corresponding four inner corners of the mirror base 7 and are integrally connected to the four corners of a mirror body 9 comprising a square plate. The mirror base 7, torsion bars 8 and mirror body 9 are fabricated from a silicon wafer. The mirror body 9 has a mirror surface formed by vapor deposition of Ag, for instance, and the reverse side of the mirror body 9 has four static electrodes 10a through 10d formed by vapor deposition or the like, in positions corresponding to the static electrodes 6athrough 6d on the electrode base 5.

The electrode base 5 and mirror base 7 are rigidly fixed to each other by means of pins 11 erected from the four corners of the electrode base 5. Under no applied voltage, the mirror body 9 and the electrode base 5 are in parallel relation.

Since the light-emitting element 2, lens 3 and rocking reflective mirror 4 are mounted on the dielectric stem 1, the whole apparatus is very compact and lightweight.

Each of said torsion bars 8 is capable of resilient deformation in a radial direction about its axis and, also, in response to a torsional force. Therefore, when a voltage is applied to any pair of opposed static electrodes 6a through 6d and 10a through 10d, the electrodes forming the pair are attracted to each other to cause resilient deformation of the torsion bars 8, with the result that the mirror body 9 is tilted. According to a variety of voltage applications, the mirror body 9 can tilt two-dimensionally in all directions.

Figure 3:
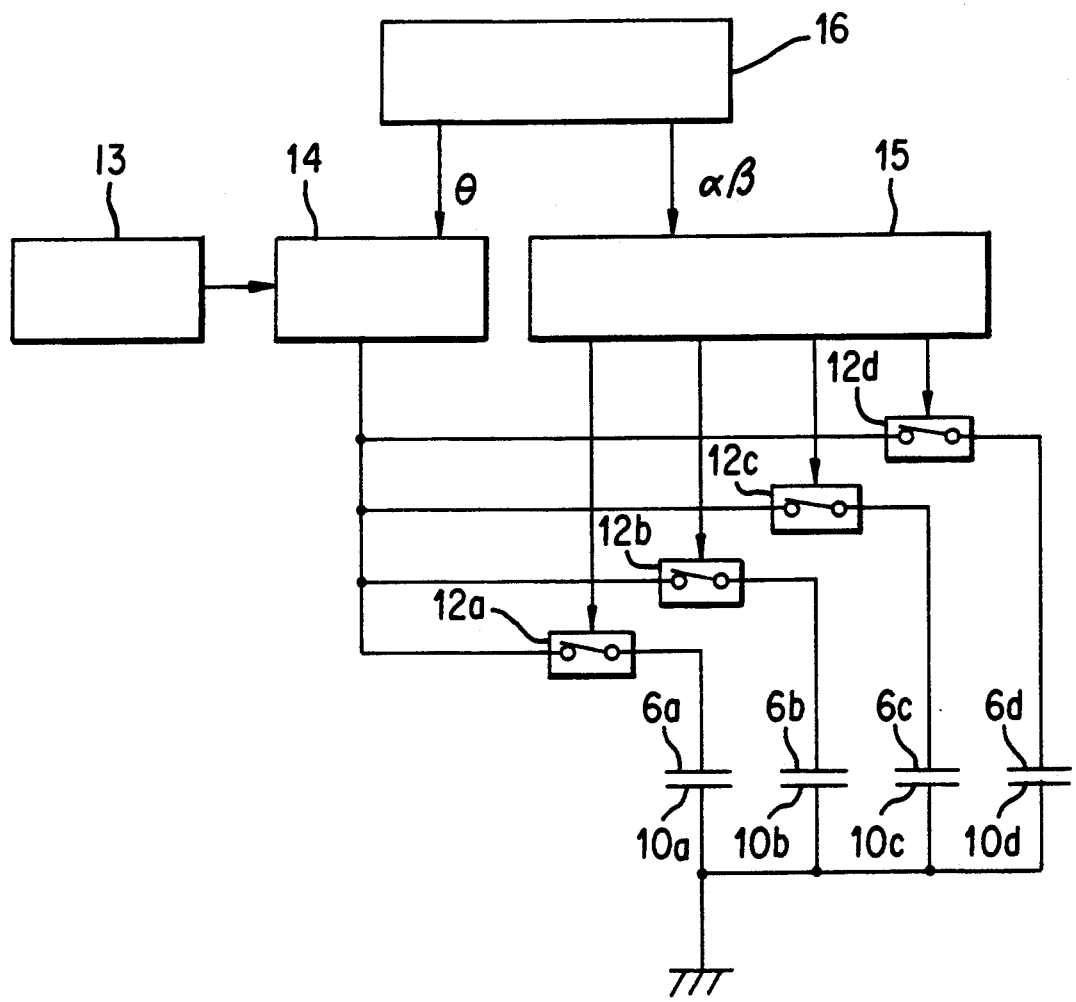

The electrical system relevant to the static electrodes 6a through 6d and 10a through 10d is described, referring to FIG. 3.

Whereas the static electrodes 10a through 10d formed on the mirror body 9 are grounded, the static electrodes 6a through 6d on the electrode base 5 are connected to a voltage controller 14. Controller 14 controls the output voltage of a direct current source 13, through respective analog switches 12a through 12d which are switched ON/OFF by a switching controller 15. The voltage controller 14 and the switching controller 15 are controlled by a scan condition setting unit 16 by which the direction and angle of scan can be inputted.

Operation of the above beam scanner is described below.

Figure 4:
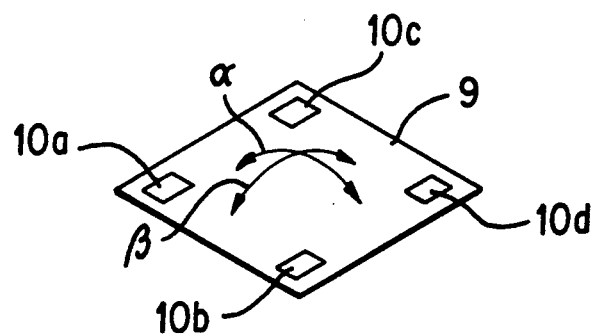

In FIG. 4, the scanning direction corresponding to the tilting of the mirror body 9 along the imaginary line interconnecting a pair of static electrodes 10a and 10b is defined as $\alpha$. The scanning direction corresponding to the tilting of the mirror body 9 along the imaginary line interconnecting the other pair of static electrodes 10a and 10c is defined as $\beta$. Selection of scanning direction $\alpha$ or $\beta$ and of scanning angle $\theta$ can be made by means of the scan condition setting unit 16.

(i) Scanning in scanning direction $\alpha$.

Thus, by means of the scan condition setting unit 16, the scanning direction $\alpha$ and angle $\theta$ are inputted. The voltage controller 14 then outputs a voltage corresponding to the scanning angle $\theta$. Accordingly, the pair of analog switches 12a, 12c and the pair of analog switches 12b, 12d (FIG. 3) are alternately switched on and off.

As an electric current is fed to the light emitting element 2, a light beam $l_1$ is emitted. This light beam $l_1$ is collimated by the lens 3, the focal point of which is situated at the light emission point of the light-emitting element 2.

Figure 5A:
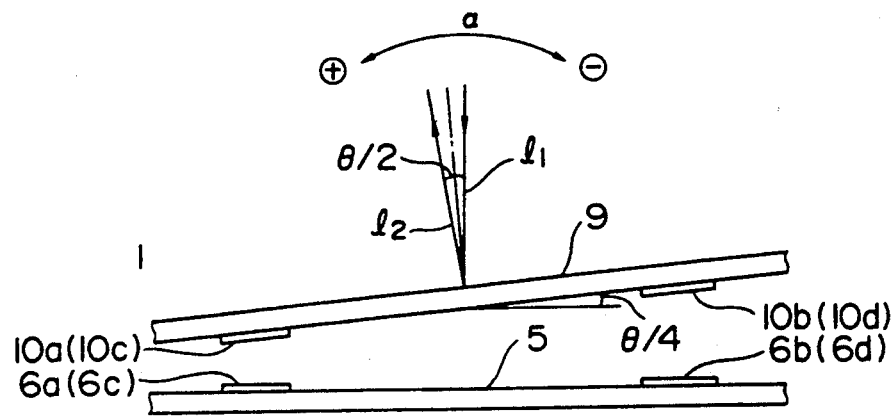
FIG. 5a and 5b is a schematic diagram illustrating operation of the beam scanner.

The switching controller 15 first switches the analog switches 12a, 12c ON and the analog switches 12b, 12d OFF. The voltage corresponding to the scanning angle $\theta$ is then supplied from the voltage controller 14 to the static electrodes 6a, 6c through the analog switches 12a, 12c. Coulomb force due to the electrostatic induction is generated between the opposed static electrodes 6a and 10a and between the opposed static electrodes 6c and 10c. Thereupon, the static electrodes 10a and 10c are attracted toward the static electrodes 6a and 6c, respectively, against the resilient force of the four torsion bars 8 as illustrated in FIG. 5(a), so that the mirror body 9 is titled $\theta/4$ forwardly in the scanning direction $\alpha$. The mirror body 9 is not tilted in the scanning direction $\beta$. In response to the tilting of the mirror body 9 in the scanning direction $\alpha$, the light beam $l_1$ emitted from the light-emitting element 2 and incident on the mirror body 9 through the lens 3 is reflected in a forwardly shifted direction. The reflected light beam $l_2$ is shifted by $\theta/2$, i.e., one-half of the scanning angle $\theta$, from the reference direction.

Then, the switching controller 15 switches the analog switches 12a, 12c OFF and the analog switches 12b, 12d ON. Thereupon, Coulomb force acting between the static electrodes 6a and 10a are released and the resilient recovery of the torsion bars 8 take place. In addition, voltage is fed from the voltage controller 14 to the static electrodes 6b, 6d through the respective analog switches 12b, 12d, and accordingly Coulomb force is produced between the opposed static electrodes 6b and 10b and between the static electrodes 6d and 10d. Then, the static electrodes 10b, 10d are attracted toward the static electrodes 6b, 6d. As a result, the mirror body 9 is tilted $\theta/4$ in reverse to the direction (a) in FIG. 5, so that the reflected light beam $l_2$ is shifted $\theta/2$ in the reverse (negative) direction.

In response to the ON/OFF action of the analog switches 12a, 12c and analog switches 12b, 12d, the mirror body 9 is rocked in a see-saw pattern in the forward (positive) and reverse (negative) directions while varying the tilting angle continuously in the scanning direction $\alpha$. Therefore, the light beam $l_2$ reflected by the mirror body 9 reciprocates in the positive and negative directions with continuous variation of scanning angle in the scanning direction $\alpha$. Unlike the one-way scanning action of the polygonal mirror, the scanning by the light beam $l_2$ is reciprocating scanning. The scanning angle throughout the reciprocation is the sum $\theta$ of $\theta/2$ in the positive direction and $\theta/2$ in the negative direction.

(ii) Scanning in scanning direction $\beta$.

Figure 5B:
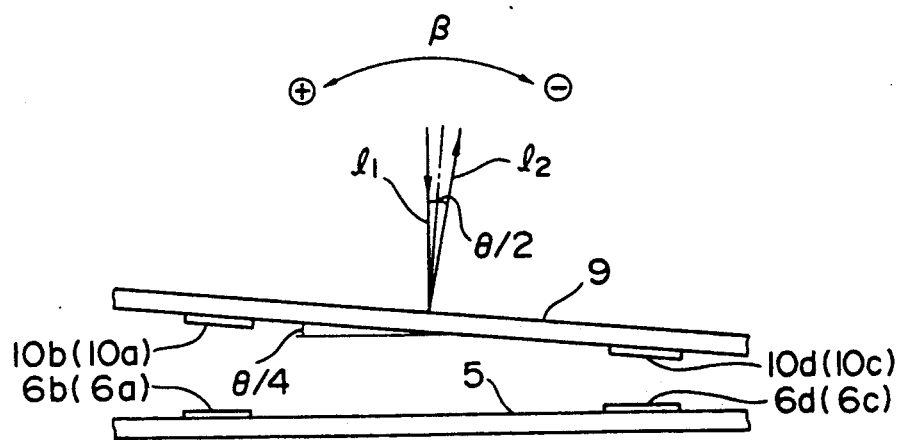

The scanning angle $\theta$ and scanning direction $\beta$ are input with the scan condition setting unit 16. In response to the input of scanning direction $\beta$, the switching controller 15 performs ON/OFF control of the pair of analog switches 12a, 12b and the pair of analog switches 12c, 12d in an alternate fashion. As a result, Coulomb force between the opposed static electrodes 6a and 10a and between static electrodes 6b and 10b and Coulomb force between the static electrodes 6c and 10c and between static electrodes 6d and 10d alternately acts, so that the mirror body 9 tilts in a seesaw pattern in the scanning direction $\beta$ with continuous variation of tilting angle. FIG. 5(b) shows the state in which Coulomb force is acting between the static electrodes 6c and 10c and between static electrodes 6d and 10d after the analog switches 12c and 12d have been switched ON. In this state, the mirror body 9 has been tilted $\theta/4$ negatively in the scanning direction $\beta$ and the light beam $l_2$ has been shifted $\theta/2$ in a negative direction with respect to the reference direction. When voltage is reversed, the light beam $l_2$ tilts $\theta/2$ in the positive direction.

Thus, the light beam $l_2$ reflected by the mirror body 9 reciprocates in the positive and negative directions, varying its scanning angle continuously. The scanning angle per reciprocation is the sum $\theta$ of $\theta/2$ in the positive direction and $\theta/2$ in the negative direction.

Since the focal point of the lens 3 is situated at the light emission point of the light-emitting element 2, the light beam $l_2$ is retained in the form of parallel rays, irrespective of changes in the tilting direction and angle of the mirror body 9.

Thus, in this embodiment, the light beam $l_2$ can be shifted in both the scanning direction $\alpha$ and the direction $\beta$ perpendicular to $\alpha$ so that two-dimensional scanning is made feasible. By programming the scan condition setting unit 16, switching controller 15 and voltage controller 14 appropriately, the mirror and hence the light beam $l_2$ can be scanned in any direction given by resultants of tiltings in $\alpha$ and $\beta$ directions.

For reference, the maximum scanning angle $\theta$ of the mirror body 9 upon application of a voltage to the pair of opposed static electrodes 6a and 10a or the pair of opposed static electrodes 6c and 10d can be calculated in the following manner.

Assuming that the sum of areas of the opposed electrodes of each pair is S, the distance between the electrodes is d, the voltage applied is V, and the dielectric constant of air is $\epsilon_o$, the total electrostatic capacity C of the opposed electrodes can be written as $$C = \epsilon_o \times \frac{S}{d} \qquad (1)$$

The electrostatic energy W accumulated between both electrodes is $$W = \tfrac{1}{2} C \times V^2. \qquad (2)$$

Since the relation between this energy W and the Coulomb force F is $$W = F \cdot d \qquad (3)$$

the Coulomb force F can be calculated by equations (1) through (3), as follows.

$$F = \frac{\epsilon_o \cdot S}{2d^2} \times V^2 \qquad (4)$$

On the other hand, assuming that the bending moment acting on the mirror body 9 is M, the bending rigidity of the torsion bars 8 as a whole is G, and the distance between the bending center and the action point of Coulomb force F is L, the following relation holds.

$$M = G \times \theta = F \times L \qquad (5)$$

Therefore, the tilting angle $\phi (= \theta/4)$ of the mirror body 9 can be calculated by means of equations (4) and (5), as follows.

$$\phi = \frac{FL}{G} = \frac{\epsilon_o \cdot S \cdot L}{2G \cdot d^2} \times V^2 \qquad (6)$$

Therefore, the scanning angle $\theta$ can be defined by:

$$\theta = \frac{2 \epsilon_o \cdot S \cdot L}{2G \cdot d^2} \times V^2 \qquad (7)$$

Thus, the scanning angle $\theta$ is proportional to the square of the applied voltage.

It should be understood that more or less than four pairs of the opposed static electrodes can be used.

The following effects are provided by this invention.

(a) Since a rocking mirror driven by electrostatic Coulomb forces is used for beam for scanning in this embodiment, the mirror can be an ordinary plain mirror. Because the static electrodes for generating Coulomb force are thin, a dramatic size reduction can be realized compared with the prior art beam scanner which requires a polygonal mirror having a plurality of reflective surfaces and a motor for driving the polygonal mirror.

(b) Since, unlike the polygonal mirror, the rocking reflective mirror does not require serially switchable plural reflective surfaces but reflects the incident light beam by the same surface, it does not require a high degree of workmanship. Therefore, the processing tolerances are by far less rigorous than those required for the manufacture of a polygonal mirror, thus contributing to cost reduction.

(c) Since the tilting angle of the rocking reflective mirror can be controlled by adjusting voltage to be applied to the opposed static electrodes, the scanning angle of the light beam can be easily and accurately controlled.

(d) As the rocking reflective mirror reciprocates in two directions, reciprocating scanning can be accomplished.

A second embodiment of this invention is described below, referring to FIGS. 6 through 9. The beam scanner according to this second embodiment generally comprises a light-emitting element, a lens disposed forwardly of the light-emitting element in such a manner that its optical axis is parallel with the optical axis of the light-emitting element, and a displacement mechanism adapted to displace either the light-emitting element or the lenses in a direction generally perpendicular to the optical axis thereof. The principle of operation of this second embodiment is as follows:

Irrespective of which of the light-emitting element and the lens is displaced by the displacement mechanism, it can be thought that the lens is displaced with respect to the light-emitting element. The lens is disposed with its optical axis perpendicular to the optical axis of the light-emitting element and the direction of relative displacement of the lens is substantially parallel to the optical axis of the light-emitting element. Therefore, in response to the relative displacement of the lens, the straight line connecting the light emission point of the light-emitting element with the center of the lens is inclined with respect to the optical axis of the light-emitting diode. The optical axis of the lens is kept in parallel with the optical axis of the light-emitting element. The direction of this inclined straight line is the direction of emission of the light beam. As the amount of relative displacement of the lens increases or decreases, the angle of inclination of the light beam is also increased or decreased so that the required beam scanning is accomplished.

Since the displacement mechanism need not be rotary but a reciprocating system, it is possible to use a pair of static electrodes utilizing Coulomb force due to electrostatic induction, a solenoid coil utilizing electromagnetic force or a piezoelectric element. Unlike the motor for rotation, this displacement mechanism can be extremely compact.

The lens can be a condenser or a grating lens (Fresnel lens) and both of them call for much less workmanship than the polygonal mirror having a plurality of reflective surfaces. Moreover, it can be much smaller than the polygonal mirror.

Irrespective of whether the displacement mechanism comprises static electrodes, a solenoid coil or a piezoelectric element, the amount of displacement can be adjusted by controlling the amount of electric energy (voltage or current) applied thereto, with the result that the beam scanning angle can also be freely controlled. Moreover, since the relative displacement of the lens by this displacement mechanism is a reciprocating displacement, scanning is also reciprocating.

This embodiment is described in further detail below.

Figure 6:
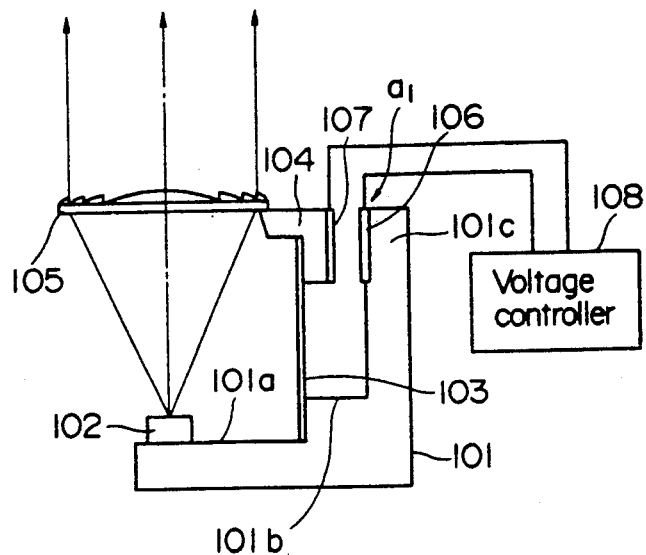
FIG. 6 is front view showing a beam scanner according to a second embodiment of the invention.

Referring to FIG. 6, a generally L-shaped insulating stem 101 carries a light-emitting element 102 which can be a laser diode or a light-emitting diode mounted on the horizontal member 101a. This beam scanner further includes a plate spring 103 extending in parallel with the optical axis of said light-emitting element 102, with its lower and being secured rigidly to a step 101b of stem 101 and its upper and carrying a movable member 104 which is displaceable in a direction perpendicular to the optical axis of the light-emitting element 102. A grating lens (Fresnel lens whose optical axis coincides with the optical axis of the light-emitting element 102 is mounted forwardly of the light-emitting element 102. The grating lens 105 is mounted in such a position that its focal point is on the light emission point of the light-emitting element 102. A clearance is provided between the vertical member 101c of the stem 101 and the movable member 104. Static electrodes 106 and 107 are mounted in opposed relation on vertical member 101c and movable member 104, respectively. These static electrodes 106, 107 are connected to a voltage controller 108. In this embodiment, the static electrodes 106, 107 constitute a displacement mechanism a1.

As the light-emitting element 102 is supplied with electric current, it outputs a light beam. Since the focal point of the grating lens 105 is on the light emission point of the light-emitting element 102, the light beam passing through the grating lens 105 is collimated.

Figure 7A:
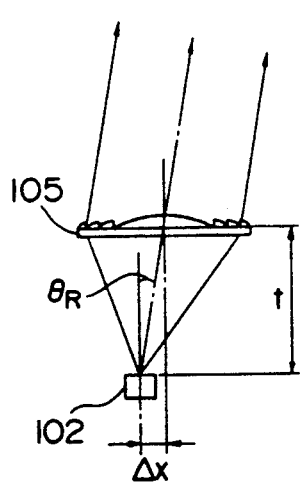
FIGS. 7a, 7b and 7c are schematic diagrams showing operation of the same bean scanner.

As a square wave is applied from a voltage controlled 108 to the static electrodes 106, 107. Coulomb force due to static induction is generated between the static electrodes at the high level of the square wave so that the static electrode 107 is attracted toward the static electrode 106 against the resilient force of the plate spring 103. As a result, the grating lens 105 along with the movable member 104 is displaced to the right, i.e. in a direction perpendicular to the optical axis of the light-emitting element 102 as illustrated in FIG. 7(a). Since the focal point of the grating lens 105 is on the light emission point of the light-emitting element 102, irrespective of the amount of displacement of the lens 105, the direction of the light beam emergent from the grating lens 105 is parallel to the straight line connecting the light emission point of the light-emitting element 102 with the center of the grating lens 105. Assuming that he maximum displacement of the grating lens 105 with respect to the optical axis of the light-emitting element 102 is $A_x$ and the focal distance of the grating lens 105 is f, the maximum scanning angle $\theta_R$ to the right is $$\theta_R = \tan^{-1}(\Delta_x/f)$$

Figure 7B:
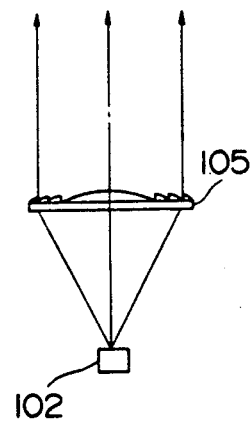
Figure 7C:
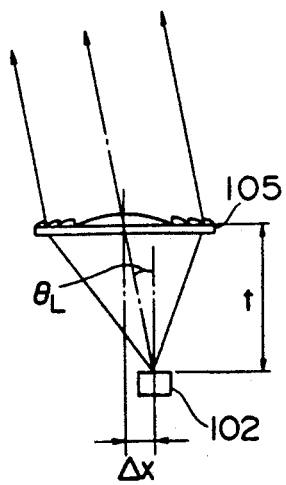

At the low level of the square wave, no Coulomb force is generated so that the grating lens 105 along with the movable member 104 is displaced by the resilient recovery force of the plate spring 103 through the optical axis of the light-emitting element [FIG. 7(b)] to the left side as shown in FIG. 7(c). The amount of displacement to the left side is substantially equal to that to the right side. Thus, the maximum scanning angle $\theta_L$ to the left is given by $$\theta_L = -\tan^{-1}(-\Delta_x/f)$$

Therefore, the scanning angle $\theta$ in both directions, right and left, is $$\theta = \theta_R + \theta_L = 2\tan^{-1}(\Delta_x/f)$$

As the high and low levels of the square wave are alternately applied to the static electrodes 106, 107, the grating lens 105 is displaced alternately to the right and left with respect to the optical axis of the light-emitting element 102 to effect beam scanning. Unlike the unilateral scanning action of the polygonal mirror, this scanning is a reciprocating scan. The scanning angle $\theta$ can be adjusted by controlling the voltage or frequency of the square wave output from the voltage controller 108.

A modification of the above second embodiment is described below.

In this embodiment, the grating lens is stationary, while the light-emitting element is displaceable.

Figure 8:
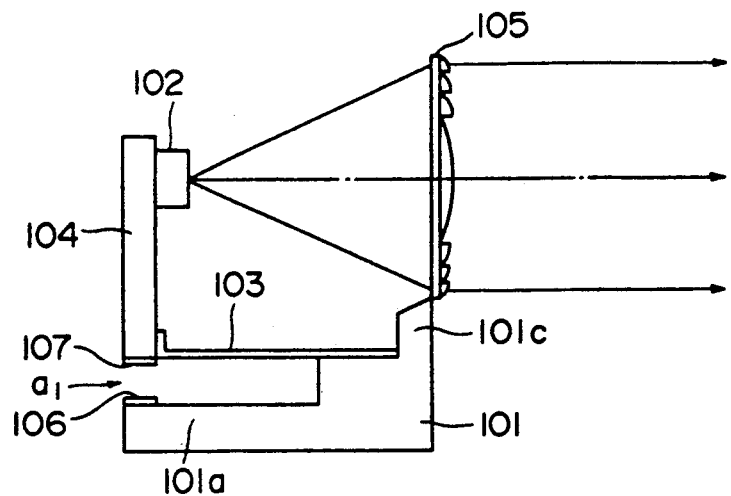
FIG. 8 is a front view showing a modification of the beam scanner according to the second embodiment.

Referring to FIG. 8, a grating lens 105 is fixedly secured to the vertical member 101c of a dielectric stem 101 and a light-emitting element 102 is mounted at the free end of a plate spring 103 extending from the step of stem 101 through a movable member 104. Static electrodes 106, 107, which constitute a displacement mechanism a1, are mounted in opposed relation on the horizontal member 101b of the stem 101 and the movable member 104, respectively. Under no voltage applied to the static electrodes 106, 107, the optical axis of the light-emitting element 102 coincides with the optical axis of the grating lens 105.

Operation of this embodiment is basically identical with that of the preceding embodiment except that the application of a square wave to the static electrodes 106, 107 results in displacement of the light-emitting element 102.

Another modification of the second embodiment is described below.

Figure 9:
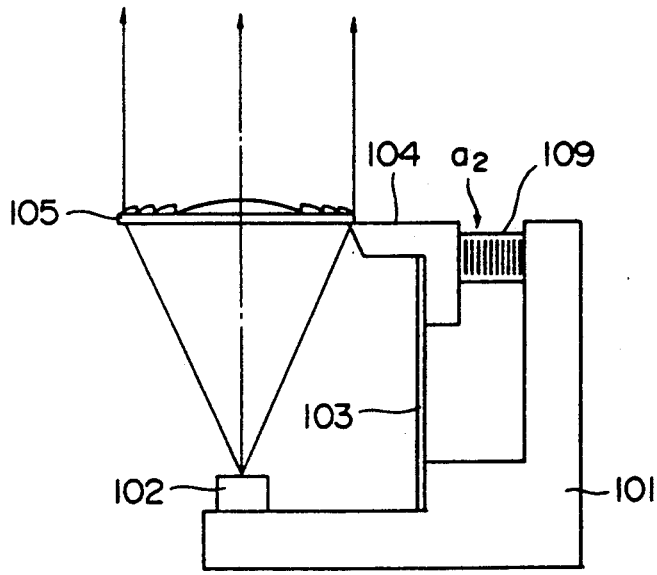
FIG. 9 is a front view showing another modification of the beam scanner according to the second embodiment.
Figure 10:
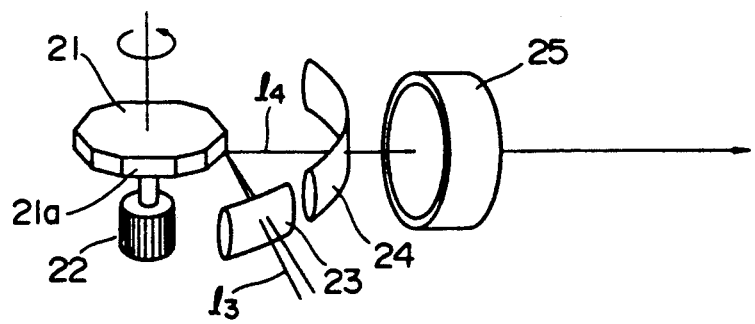
FIG. 10 is a schematic view showing a prior art beam scanner.

This modification, schematically illustrated in FIG. 9, is similar to the foregoing embodiment but a piezoelectric element a2 is employed for the displacement mechanism.

Though not shown, a solenoid coil may be used in lieu of said static electrodes 106, 107 or piezoelectric element 109.

Furthermore, instead of a grating lens, a condenser lens can be employed for collimating.

Moreover, by providing another set of plate spring 103 and movable member 104, it in possible to implement a two-dimensional beam scanner which has not been available so far.

The beam scanner according to the above embodiment of the invention offers to the following advantages.

Because, just as the first embodiment, this embodiment can also be implemented with static electrodes, a solenoid coil or a piezoelectric element for relative shifting of the lens and a plain mirror in lieu of a bulky polygonal mirror, the overall size of the beam scanner can be much smaller. The lens to be relatively shifted does not require any extraordinarily high degree of workmanship, so that the costs of manufacture can be as much degreased. By controlling the energy output to the displacement mechanism, the amount of displacement can be adjusted to select the desired scanning angle. Moreover, reciprocal displacement of the lens permits a reciprocating scan.

The above description and the accompanying drawings are merely illustrative of the application of the principles of the present invention and are not limiting. Numerous other arrangements which embody the principles of the invention and which fall within its scope may be readily devised by those skilled in the art. Accordingly, the invention is not limited by the foregoing description, but is only limited by the scope of the appended claims.

What is claimed:

1. A beam scanner, comprising:
   a light-emitting element;
   a lens disposed forwardly of said light emitting element;
   a rocking reflective mirror disposed forwardly of said lens;
   a displacement mechanism for said mirror comprising a dielectric electrode base, a plurality of electrode pairs with one electrode of each electrode pair being located on said dielectric electrode base and the other electrode of each electrode pair being located on the rocking reflective mirror such that each electrode of an electrode pair faces another electrode of the same electrode pair, and a plurality of torsion bars flexibly fixing said mirror in position relative to said dielectric electrode base; and
   means for applying a voltage to selected ones of said electrode pairs to produce static fields across said selected ones of said electrode pairs and a displacement of said mirror.

2. The beam scanner of claim 1, further comprising an insulating stem having three pedestals respectively carrying said light-emitting element, said lens and said rocking reflective mirror.

3. The beam scanner of claim 2, wherein said mirror includes a mirror body having four corners and wherein the displacement mechanism further comprises a rectangular frame shaped mirror base with said torsion bars extending inwardly from the four inner corners thereof and connected to the four corners of said mirror body, said mirror base and said dielectric electrode base being connected with each other in such a manner tat said mirror, mirror base, and dielectric electrode base are in a parallel relation when no voltage is applied by said voltage applying means to any of said electrode pairs.

4. The beam scanner of claim 3, wherein the electrodes on one of said mirror body and electrode base for each electrode pair are grounded and said voltage applying means comprises a voltage controller connected to the electrodes on the other of said mirror body and electrode base of each electrode pairs through respective analog switches, and a switching controller for controlling said analog switches.

5. The beam scanner of claim 4, wherein the electrodes on said mirror body are grounded and the electrodes on said electrode base are connected to said voltage controller through said respective analog switches.

6. The beam scanner of claim 1, wherein said mirror includes a mirror body having four corners and wherein the displacement mechanism comprises a rectangular frame shaped mirror base with said torsion bars extending inwardly from the four inner corners thereof and connected to the four corners of said mirror body, said mirror base and said dielectric electrode base being integrally connected with each other in such a manner that said mirror, mirror base, and dielectric electrode base are in a parallel relation when no voltage is applied by said voltage applying means to any of said plurality of electrode pairs.

7. The beam scanner of claim 6, wherein the electrodes on one of said mirror body and electrode base for each electrode pair are grounded and said voltage applying means comprises:
   a voltage controller connected to the electrodes on the other of said mirror body and electrode base of each electrode pair through respective analog switches, and switching controller for controlling said analog switches.

8. The beam scanner of claim 7, wherein the electrodes on said mirror body are grounded and the electrodes on said electrode base are connected to said voltage controller through said respective analog switches.

* * * * *